(12) United States Patent
Kim et al.

(10) Patent No.: US 11,749,838 B2
(45) Date of Patent: Sep. 5, 2023

(54) ELECTROLYTE SOLUTION FOR LITHIUM SECONDARY BATTERIES AND LITHIUM SECONDARY BATTERY INCLUDING THE SAME

(71) Applicants: HYUNDAI MOTOR COMPANY, Seoul (KR); Kia Corporation, Seoul (KR); UNIST(ULSAN NATIONAL INSTITUTE OF SCIENCE AND TECHNOLOGY), Ulsan (KR)

(72) Inventors: Ko Eun Kim, Cheongju-si (KR); Sung Ho Ban, Hwaseong-si (KR); Yoon Sung Lee, Suwon-si (KR); Seung Min Oh, Incheon (KR); Ik Kyu Kim, Gwangmyeong-si (KR); Sang Kyu Kwak, Ulsan (KR); Nam Soon Choi, Ulsan (KR); Sung You Hong, Ulsan (KR); Woo Gyum Kim, Ulsan (KR); Dae Yeon Hwang, Ulsan (KR); Hyeon Gyu Moon, Ulsan (KR)

(73) Assignees: Hyundai Motor Company, Seoul (KR); Kia Corporation, Seoul (KR); UNIST (Ulsan National Insitute of Science and Technology), Ulsan (KR)

( * ) Notice: Subject to any disclaimer, the term of this patent is extended or adjusted under 35 U.S.C. 154(b) by 211 days.

(21) Appl. No.: 17/394,927

(22) Filed: Aug. 5, 2021

(65) Prior Publication Data
US 2022/0149432 A1    May 12, 2022

(30) Foreign Application Priority Data
Nov. 6, 2020   (KR) .................. 10-2020-0147719

(51) Int. Cl.
H01M 10/0567    (2010.01)
H01M 10/0525    (2010.01)
H01M 10/0568    (2010.01)
H01M 10/0569    (2010.01)
H01M 4/38       (2006.01)
(Continued)

(52) U.S. Cl.
CPC ... H01M 10/0567 (2013.01); H01M 10/0525 (2013.01); H01M 10/0568 (2013.01); H01M 10/0569 (2013.01); H01M 4/386 (2013.01); H01M 4/505 (2013.01); H01M 4/525 (2013.01); H01M 4/587 (2013.01);
(Continued)

(58) Field of Classification Search
None
See application file for complete search history.

(56) References Cited

FOREIGN PATENT DOCUMENTS
KR    10-2019-0092149    8/2019

Primary Examiner — Eli S Mekhlin
(74) Attorney, Agent, or Firm — Fox Rothschild LLP

(57) ABSTRACT

Disclosed are an electrolyte solution for lithium secondary batteries and a lithium secondary battery including the same. The electrolyte solution for lithium secondary batteries includes: a lithium salt; a solvent; and a functional additive, wherein the functional additive includes a first positive-electrode film additive, which is 2-(2'((tert-butoxycarbonyl)amino)ethoxy)-ethyl p-methylbenzenesulfonate, represented by the following Formula 1:

[Formula 1]

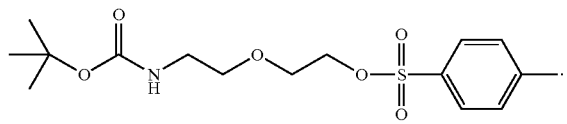

9 Claims, 5 Drawing Sheets

(51) Int. Cl.
*H01M 4/02* (2006.01)
*H01M 4/525* (2010.01)
*H01M 4/587* (2010.01)
*H01M 4/505* (2010.01)

(52) U.S. Cl.
CPC ............... *H01M 2004/027* (2013.01); *H01M 2004/028* (2013.01); *H01M 2300/0025* (2013.01)

ELECTROLYTE SOLUTION FOR LITHIUM SECONDARY BATTERIES AND LITHIUM SECONDARY BATTERY INCLUDING THE SAME

CROSS-REFERENCE TO RELATED APPLICATION

This application claims priority to and the benefit of Korean Patent Application No. 10-2020-0147719, filed on Nov. 6, 2020, the entire contents of which are incorporated herein by reference.

FIELD

The present disclosure relates to an electrolyte solution for lithium secondary batteries and a lithium secondary battery including the same.

BACKGROUND

The statements in this section merely provide background information related to the present disclosure and may not constitute prior art.

A lithium secondary battery is an energy storage device that includes a positive electrode for supplying lithium and a negative electrode for receiving lithium during charging, an electrolyte serving as a medium for transferring a lithium ion, and a separator for separating the positive electrode and the negative electrode from each other. The lithium secondary battery generates electrical energy and stores the same through a change in chemical potential when the lithium ion is intercalated or de-intercalated on the positive electrode or the negative electrode.

Such a lithium secondary battery has mainly been used in portable electronic devices, but has recently come to be used as energy storage means for electric vehicles (EVs) and hybrid electric vehicles (HEVs) in response to recent commercialization of electric vehicles (EVs) and hybrid electric vehicles (HEVs).

Meanwhile, research is underway to increase the energy density of a lithium secondary battery in order to increase the mileage of an electric vehicle, and the increase in the energy density of the lithium secondary battery is possible through a high capacity of the positive electrode.

A lithium secondary battery having a high energy density may be developed by developing a novel material capable of overcoming the performance limitations of conventional lithium secondary battery materials such as positive electrode, negative electrode, separator and electrolyte.

In particular, the energy density of a battery greatly depends on the characteristics of the materials of the positive electrode and negative electrode, and in order for the developed positive electrode and negative electrode materials to exhibit excellent electrochemical performance, we have discovered that the development of a suitable electrolyte is desired.

In layered nickel (Ni)-rich $LiNi_{1-x-y}Co_xMn_yO_2$ (NCM; 1-x-y≥0.6) oxide, which is a high-capacity positive electrode active material, the positive electrode capacity can be increased by increasing the Ni content or increasing the charging voltage. However, lithium ($Li_2CO_3$ and LiOH) components remaining on the surface of the positive electrode may promote decomposition of the electrolyte and increase the rate of deterioration due to an increase in interfacial reactivity with the electrolyte, resulting in rapid deterioration of charge and discharge performance.

Therefore, technology for controlling the positive-electrode/electrolyte and negative-electrode/electrolyte interface is very important. For this purpose, we have discovered that introducing an additive capable of forming an electrochemically and chemically stable film is desired.

The above information disclosed in this Background section is provided only for enhancement of understanding of the background of the disclosure and therefore it may contain information that does not form the prior art that is already known to a person of ordinary skill in the art.

SUMMARY

The present disclosure provides an electrolyte solution for lithium secondary batteries capable of increasing the lifespan and output of the lithium secondary batteries and a lithium secondary battery including the electrolyte.

In one form of the present disclosure, an electrolyte solution for lithium secondary batteries includes: a lithium salt; a solvent; and a functional additive, wherein the functional additive includes a first positive-electrode film additive, which is 2-(2'((tert-butoxycarbonyl)amino)ethoxy)-ethyl p-methylbenzenesulfonate, represented by the following Formula 1:

[Formula 1]

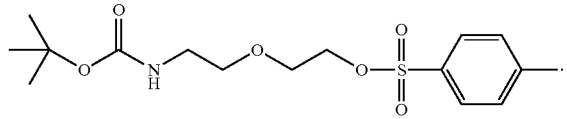

The first positive-electrode film additive may be added in an amount of 0.5 to 2.0% by weight or less with respect to the weight of the electrolyte solution.

The functional additive further includes one or a mixture of two or more of a first negative-electrode film additive which is vinylene carbonate (VC), a second negative-electrode film additive which is fluoroethylene carbonate (FEC), and a second positive-electrode film additive which is $LiPO_2F_2$.

The functional additive selected from the first negative-electrode film additive, the second negative-electrode film additive, and the second positive-electrode film additive may be added in an amount of 0.5 to 3.0% by weight with respect to the weight of the electrolyte solution.

The lithium salt may include at least one compound selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

The solvent may include at least one substance selected from the group consisting of carbonate solvents, ester solvents, ether solvents and ketone solvents.

In another form of the present disclosure, a lithium secondary battery includes the electrolyte solution described above. In addition, the lithium secondary battery may further include: a positive electrode including a positive-electrode active material containing Ni, Co and Mn; a negative electrode including a negative-electrode active material selected from a carbon (C)-based material or a silicon (Si)-based material; and a separator interposed between the positive electrode and the negative electrode.

The positive electrode has a Ni content of 80% by weight or more.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
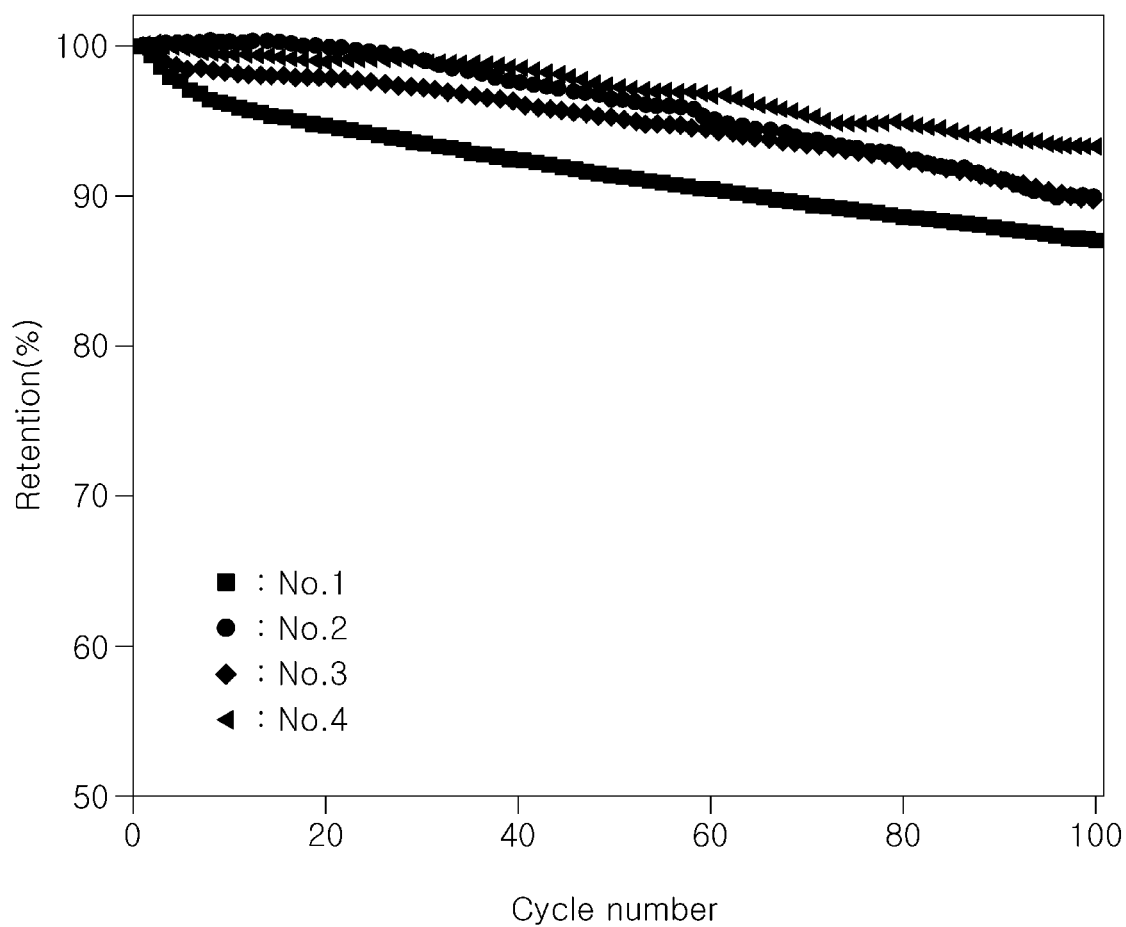
FIGS. 1 and 2 are graphs showing results of experiments for evaluating the lifespan of Examples and Comparative Examples.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to various forms of the present disclosure, examples of which are illustrated in the accompanying drawings. However, the present disclosure may be implemented in various forms. The forms are provided only to fully illustrate the present disclosure and to completely inform those having ordinary knowledge in the art of the scope of the present disclosure.

The electrolyte solution for lithium secondary batteries according to one form of the present disclosure is a material forming an electrolyte applicable to lithium secondary batteries and includes a lithium salt, a solvent and a functional additive.

The lithium salt may be one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

In this case, the lithium salt may be present at a concentration of 0.1 to 3.0 moles, preferably 0.1 to 1.2 moles, in the electrolyte solution.

The solvent may be one or a mixture of two or more selected from the group consisting of carbonate solvents, ester solvents, ether solvents and ketone solvents.

In this case, the carbonate solvent may be dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), fluoroethylene carbonate (FEC), vinylene carbonate (VC) or the like. In addition, the carbonate solvent may be an ester solvent such as γ-butyrolactone (GBL), n-methyl acetate, n-ethyl acetate or n-propyl acetate, or an ether solvent such as dibutyl ether, but is not limited thereto.

In addition, the solvent may further include an aromatic hydrocarbon-based organic solvent. Specific examples of the aromatic hydrocarbon-based organic solvent may include benzene, fluorobenzene, bromobenzene, chlorobenzene, cyclohexylbenzene, isopropylbenzene, n-butylbenzene, octylbenzene, toluene, xylene, mesitylene, and the like, and this solvent may be used alone or in combination.

Meanwhile, the first positive-electrode film additive, which is 2-(2'((tert-butoxycarbonyl)amino)ethoxy)-ethyl p-methylbenzenesulfonate (hereinafter, referred to as "Additive 1"), represented by the following Formula 1, may be used as the functional additive added to the electrolyte solution according to one form of the present disclosure:

[Formula 1]

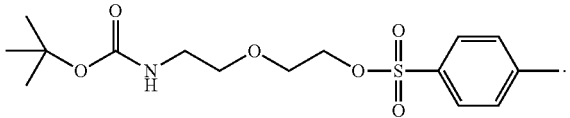

At this time, the first positive-electrode film additive, 2-(2'((tert-butoxycarbonyl)amino)ethoxy)-ethyl p-methylbenzenesulfonate (Additive 1), forms a film of a Li-ion conductive material on the surface of the positive electrode active material to prolong the lifespan thereof.

In other words, the first positive-electrode film additive (Additive 1) forms a film of an ionic component such as $R-SO_3-Li^+$ on the surface of the positive electrode to facilitate the movement of lithium ions. In addition, such an S—O-based film component can prolong the lifespan at high temperatures owing to excellent thermal stability. Further, the film formed on the surface of the positive electrode can suppress oxidative decomposition by the electrolyte.

In addition, the first positive-electrode film additive is preferably added in an amount of 0.5 to 2.0% by weight based on the weight of the electrolyte solution.

When the amount of the first positive-electrode film additive that is added is less than 0.5% by weight, disadvantageously, it is difficult to form a sufficient surface protective film on the surface of the positive electrode active material and thus a sufficient effect cannot be expected, and when the amount of the first positive-electrode film additive that is added is higher than 2.0% by weight, disadvantageously, the surface protective film may be excessively formed and the cell resistance increases, and thus the lifespan of the cell may be deteriorated.

Meanwhile, one or two or more of a negative-electrode film additive, serving to form a film on the negative electrode, and a second positive-electrode film additive, serving to form a film on the positive electrode, may be selectively used as the functional additive.

For example, as the negative-electrode film additive, a first negative-electrode film additive, vinylene carbonate (hereinafter referred to as "VC"), or a second negative-electrode film additive, fluoroethylene carbonate (hereinafter referred to as "FEC"), may be used. In addition, $LiPO_2F_2$ may be used as the second positive-electrode film additive.

In addition, the functional additive selected from among the first negative-electrode film additive, the second negative-electrode film additive, or the second positive-electrode film additive is preferably added in an amount of 0.5 to 3.0% by weight based on the weight of the electrolyte solution.

At this time, each of the selected first negative-electrode film additive, second negative-electrode film additive, or second positive-electrode film additive is preferably added in an amount of 0.5 to 3.0% by weight, based on the weight of the electrolyte solution.

When the amount of the selected first negative-electrode film additive, second negative-electrode film additive, or second positive-electrode film additive is less than 0.5% by weight, there is a problem in that the long-term lifespan of the cell is deteriorated, and when the amount is more than 3.0% by weight, there are problems in that the cell resistance may increase due to the excessive formation of the surface protective layer, resulting in reduced battery output.

Meanwhile, the lithium secondary battery according to one form of the present disclosure includes a positive electrode, a negative electrode and a separator, in addition to the above-described electrolyte solution.

The positive electrode includes an NCM-based positive-electrode active material containing Ni, Co and Mn. In particular, the positive-electrode active material included in the positive electrode in this form preferably contains only an NCM-based positive-electrode active material containing Ni in an amount of 80% by weight or more.

In addition, the negative electrode contains one or more selected from a carbon (C)-based negative-electrode active material and a silicon (Si)-based negative-electrode active material.

The carbon (C)-based negative-electrode active material may include at least one material selected from the group consisting of artificial graphite, natural graphite, graphitized carbon fiber, graphitized mesocarbon microbeads, fullerene and amorphous carbon.

In addition, the silicon (Si)-based negative active material includes silicon oxide, silicon particles, and silicon alloy particles.

Meanwhile, the positive electrode and the negative electrode are produced by mixing each of active materials with a conductive material, a binder and a solvent to prepare an electrode slurry, and then directly coating a current collector with the electrode slurry, followed by drying. In this case, aluminum (Al) may be used as the current collector, but the present disclosure is not limited thereto. Since such an electrode production method is well known in the art, a detailed description thereof will be omitted.

The binder serves to promote adhesion between particles of each active material or adhesion thereof to the current collector. For example, the binder may be polyvinyl alcohol, carboxymethyl cellulose, hydroxypropyl cellulose, diacetyl cellulose, polyvinyl chloride, carboxylated polyvinylchloride, polyvinylfluoride, an ethylene-oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, or the like, but is not limited thereto.

In addition, the conductive material is used to impart conductivity to the electrode, and any one can be used, as long as it is an electrically conductive material that does not cause a chemical change in the battery to be produced, and examples thereof include natural graphite, artificial graphite, carbon black, acetylene black, Ketjen black, carbon fibers, metal powders such as copper, nickel, aluminum and silver powders, metal fibers, and the like. In addition, a conductive material such as a polyphenylene derivative may be used alone or in combination.

The separator inhibits a short circuit between the positive electrode and the negative electrode, and provides a passage for lithium ions. Such a separator may be a well-known separator selected from polyolefin-based polymer membranes such as polypropylene, polyethylene, polyethylene/polypropylene, polyethylene/polypropylene/polyethylene and polypropylene/polyethylene/polypropylene, and multiple membranes, microporous films, woven fabrics and nonwoven fabrics thereof. In addition, a porous polyolefin film coated with a resin having excellent stability may be used.

Hereinafter, the present disclosure will be described with reference to Examples and Comparative Examples according to the present disclosure.

<Experiment 1> Experiment on Cell Resistance and Lifespan at High Temperature (45° C.) According to the Type of Functional Additive in Case of Using Graphite as Negative Electrode In order to determine the cell resistance and high-temperature lifespan depending on the type of functional additive added to the electrolyte, in the case of using graphite as the negative electrode, initial cell resistance and discharge retention at a high temperature of 45° C. upon 100 cycles of charging and discharging were measured while the type of the functional additive as shown in the following Table 1 was changed, and the results are shown in Table 1 and in FIG. 1.

At this time, the cycle was carried out under the following conditions: a cut-off voltage of 2.5-4.2V, a C-rate of 1 C, and a temperature of 45° C. The lithium salt used to prepare the electrolyte solution was 1M $LiPF_6$, and the solvent used was a solvent mixture containing ethylene carbonate (EC), ethyl methyl carbonate (EMC) and diethyl carbonate (DEC) at a volume ratio of 25:45:30.

NCM811 was used as the positive electrode, and graphite was used as the negative electrode.

TABLE 1

| Item | | VC | Additive $LiPO_2F_2$ | Additive 1 | Initial cell resistance (%) | High-temperature lifespan (%)@100 cyc |
|---|---|---|---|---|---|---|
| No. 1 | Comparative Example | — | — | — | 100 | 87.0 |
| No. 2 | Comparative Example | 1.0 | — | — | 105 | 89.7 |
| No. 3 | Comparative Example | 1.0 | 0.5 | — | 107 | 89.8 |
| No. 4 | Example | 1.0 | — | 0.5 | 97 | 93.0 |

As can be seen from Table 1 and FIG. 1, No. 2 and No. 3, in which conventional general functional additives, VC and LiPO2F2 were added to an electrolyte solution, exhibited an increased high-temperature lifespan compared to No. 1, in which no additive was added to the electrolyte solution. In particular, No. 4, in which the first negative-electrode film additive (VC), which is a conventional additive, and the first positive-electrode film additive (Additive 1) according to the present invention disclosure were added, exhibited a further increased high-temperature lifespan compared to No. 3, to which the first negative-electrode film additive (VC) and the second positive-electrode film additive (LiPO2F2), which are conventional general additives, were added.

<Experiment 2> Experiment on Cell Resistance and Lifespan at High Temperature (45° C.) According to Type of Functional Additive in Case of Using Si-Graphite as Negative Electrode In order to determine the cell resistance and high-temperature lifespan depending on the type of functional additive that is added to the electrolyte, in the case of using Si-graphite as the negative electrode, initial cell resistance and discharge retention at a high temperature of 45° C. upon 50 cycles of charging and discharging were measured while the type of functional additive was changed as shown in the following Table 2, and the results are shown in Table 2 and in FIG. 2.

At this time, the cycle was carried out under the following conditions: a cut-off voltage of 2.5-4.2V, a C-rate of 1 C, and a temperature of 45° C. The lithium salt used to prepare the electrolyte solution was 1M $LiPF_6$, and the solvent that was used was a solvent mixture containing ethylene carbonate (EC), ethyl methyl carbonate (EMC) and diethyl carbonate (DEC) at a volume ratio of 25:45:30.

NCM811 was used as the positive electrode and Si-graphite was used as the negative electrode.

TABLE 2

| | | Additive | | Initial cell resistance | High-temperature lifespan (%) |
|---|---|---|---|---|---|
| Item | | VC | Additive 1 | (%) | @ 100 cyc |
| No. 5 | Comparative Example | — | — | 100 | 78.1 |
| No. 6 | Comparative Example | 1.0 | — | 106 | 82.2 |
| No. 7 | Example | 1.0 | 0.5 | 98 | 85.8 |

Figure 2:
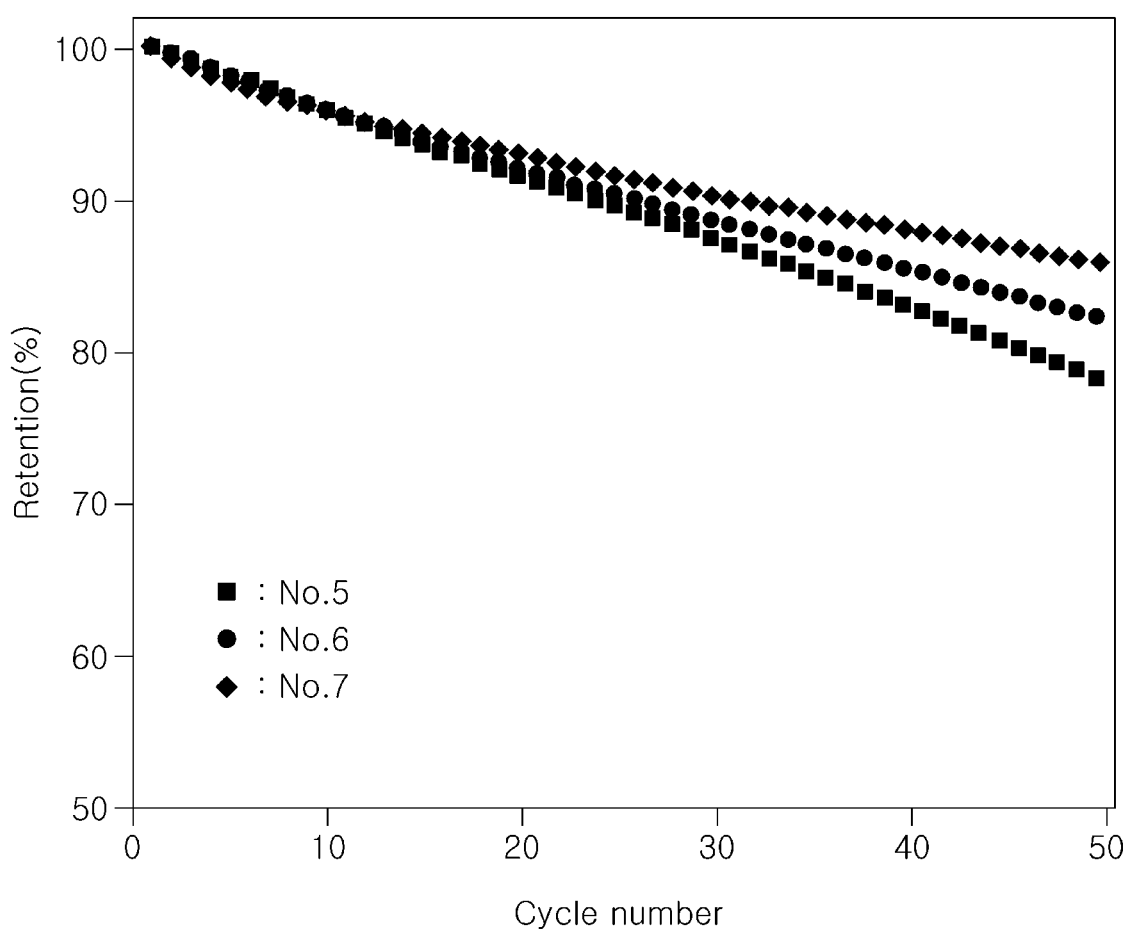

As can be seen from Table 2 and FIG. 2, No. 6, in which a conventional general functional additive VC was added to an electrolyte solution, exhibited a prolonged high-temperature lifespan compared to No. 5, in which no additive was added to the electrolyte solution. In particular, No. 7, to which both the first negative-electrode film additive (VC), which is a conventional additive, and the first positive-electrode film additive (Additive 1) according to the present disclosure were added, exhibited a further increased high-temperature lifespan compared to No. 6, to which only the first negative-electrode film additive (VC), which is a conventional additive, was added.

<Experiment 3> Experiment on Oxidation Stability (Linear Sweep Voltammetry) According to Type of Functional Additive In order to determine the oxidation stability depending on the type of functional additive added to the electrolyte, oxidation decomposition current was measured while the type of functional additive was changed as shown in the following Table 3, and the results are shown in Table 3 and in FIG. 3.

At this time, the evaluation was carried out under the following conditions: a cut-off voltage of 0CV-5.0V, a scan rate of 1 mV/s and a temperature of 30° C. The lithium salt used to prepare the electrolyte solution was 1M $LiPF_6$, and the solvent used was a solvent mixture containing ethylene carbonate (EC), ethyl methyl carbonate (EMC) and diethyl carbonate (DEC) at a volume ratio of 25:45:30.

SS was used as the positive electrode and Li was used as the negative electrode.

TABLE 3

| | | Additive | | | Oxidative decomposition current @4.3 V[µA] | Oxidative decomposition current @4.5 V[µA] |
|---|---|---|---|---|---|---|
| Item | | VC | $LiPO_2F_2$ | Additive 1 | | |
| No. 8 | Comparative Example | — | — | — | 1.5 | 2.7 |
| No. 9 | Comparative Example | 1.0 | — | — | 3.2 | 6.0 |
| No. 10 | Comparative Example | 1.0 | 0.5 | — | 2.9 | 4.7 |
| No. 11 | Example | 1.0 | — | 0.5 | 1.2 | 2.0 |

Figure 3:
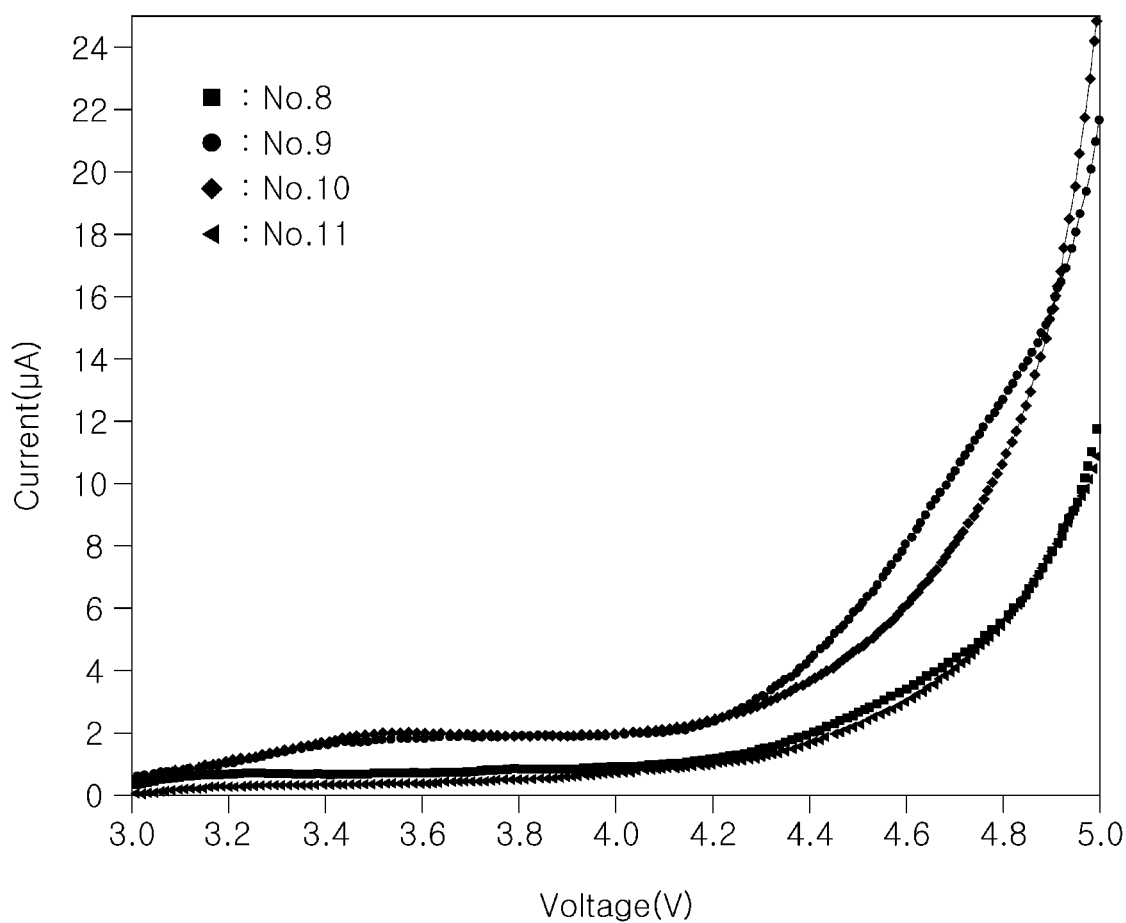
FIG. 3 is a graph showing the results of an experiment for evaluating the oxidation stability of Examples and Comparative Examples.

As can be seen from Table 3 and FIG. 3, No. 9 and No. 10, in which conventional general functional additives, VC and $LiPO_2F_2$ were added to an electrolyte solution, exhibited higher oxidation decomposition current at 4.3V and 4.5V, compared to No. 8, in which no additive was added to an electrolyte solution.

On the other hand, No. 11, in which the first negative-electrode film additive (VC), which is a conventional general functional additive, and the first positive-electrode film additive (Additive 1) according to the present disclosure were added to an electrolyte solution, exhibited lower oxidation decomposition current at 4.3V and 4.5V, compared to No. 8.

<Experiment 4> Experiment on Cell Resistance and Lifespan at High Temperature (45° C.) According to Type of Functional Additive in Case of Using Si-Graphite as Negative Electrode In order to determine the cell resistance and high-temperature lifespan depending on the type of functional additive added to the electrolyte, in case of using Si-graphite as the negative electrode, initial cell resistance and discharge retention at a high temperature of 45° C. upon 50 cycles of charging and discharging were measured while the type of the functional additive was changed as shown in the following Table 4, and the results are shown in Table 4 and in FIG. 4.

At this time, the cycle was carried out under the following conditions: a cut-off voltage of 2.5-4.2V, a C-rate of 0.5 C, and a temperature of 45° C. The lithium salt used to prepare the electrolyte solution was 1M $LiPF_6$, and the solvent used was a solvent mixture containing ethylene carbonate (EC), ethyl methyl carbonate (EMC) and diethyl carbonate (DEC) at a volume ratio of 25:45:30.

NCM811 was used as the positive electrode, and Si-graphite was used as the negative electrode.

TABLE 4

| | | Additive | | | Initial cell resistance (%) | High-temperature lifespan (%)@50 cyc |
|---|---|---|---|---|---|---|
| Item | | FEC | $LiPO_2F_2$ | Additive 1 | | |
| No. 5 | Comparative Example | — | — | — | 100 | 78.1 |
| No. 12 | Comparative Example | 1.0 | — | — | 103 | 85.1 |
| No. 13 | Comparative Example | 1.0 | 0.5 | — | 106 | 85.4 |
| No. 14 | Example | 1.0 | — | 0.5 | 95 | 87.5 |

Figure 4:
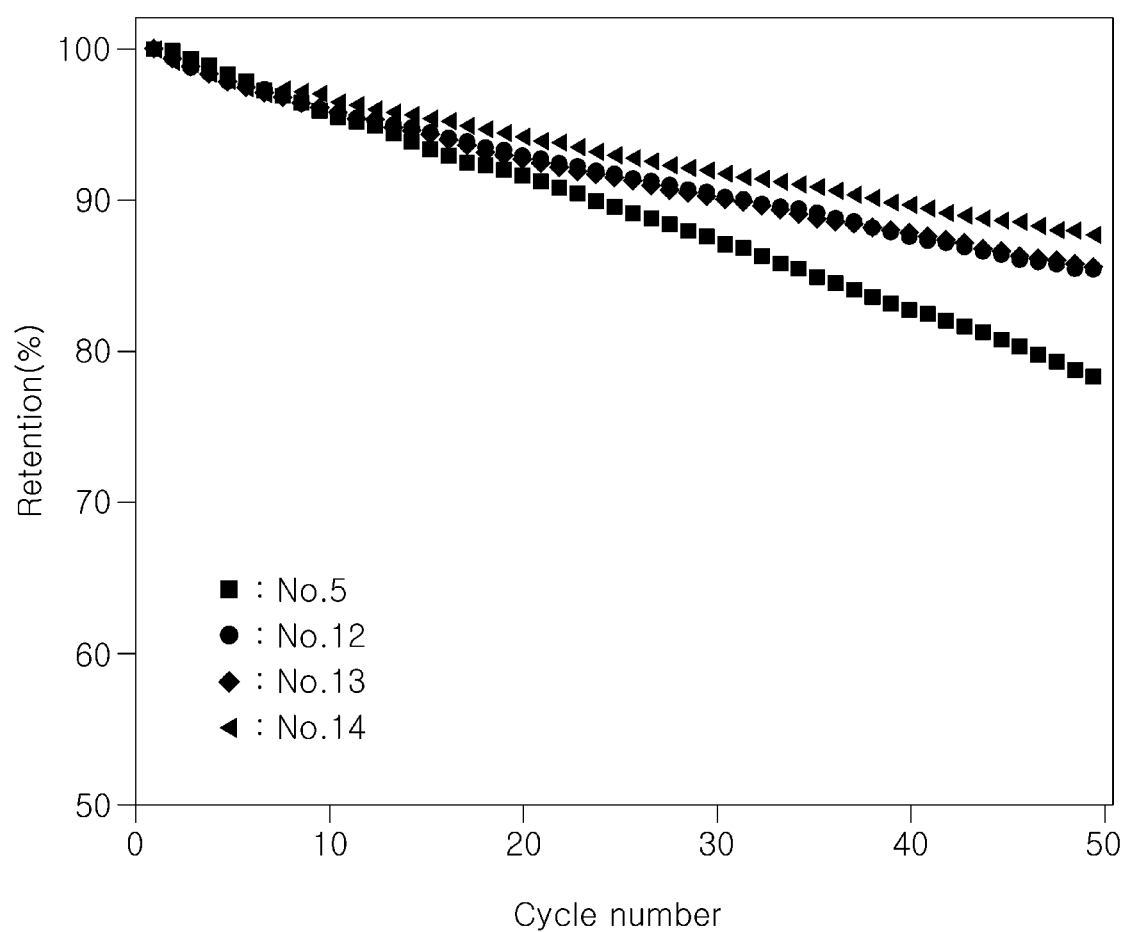
FIGS. 4 and 5 are graphs showing results of experiments for evaluating the lifespan of Examples and Comparative Examples.

As can be seen from Table 4 and FIG. 4, No. 12 and No. 13 in which conventional general functional additives, FEC and LiPO$_2$F$_2$ were added to an electrolyte solution, exhibited a longer high-temperature lifespan than No. 5, in which no additive was added to an electrolyte solution. In particular, No. 14, to which the second negative-electrode film additive (FEC), which is a conventional additive, and the first positive-electrode film additive (Additive 1) according to the present disclosure were added, exhibited further increased high-temperature lifespan compared to No. 13, to which the second negative-electrode film additive (FEC), which is a conventional additive, and the second positive-electrode film additive, LiPO$_2$F$_2$, were added.

<Experiment 5> Experiment on Cell Resistance and Lifespan at High Temperature (45° C.) According to the Type of Functional Additive for the Case of Using Si-Graphite as Negative Electrode In order to determine the cell resistance and high-temperature lifespan depending on the type of functional additive added to the electrolyte, in the case of using Si-graphite as the negative electrode, initial cell resistance and discharge retention at a high temperature of 45° C. upon 50 cycles of charging and discharging were measured while the type of the functional additive was changed as shown in the following Table 5, and the results are shown in Table 5 and in FIG. 5.

At this time, the cycle was carried out under the following conditions: a cut-off voltage of 2.5-4.2V, a C-rate of 0.5 C, and a temperature of 45° C. The lithium salt used to prepare the electrolyte solution was 1M LiPF$_6$, and the solvent used was a solvent mixture containing ethylene carbonate (EC), ethyl methyl carbonate (EMC) and diethyl carbonate (DEC) at a volume ratio of 25:45:30.

NCM811 was used as the positive electrode, and Si-graphite was used as the negative electrode.

TABLE 5

| Item | | Additive VC | FEC | Additive 1 | Initial cell resistance (%) | High-temperature lifespan (%)@50 cyc |
|---|---|---|---|---|---|---|
| No. 5 | Comparative Example | — | — | — | 100 | 78.1 |
| No. 15 | Example | — | — | 0.5 | 95 | 80.6 |
| No. 16 | Example | — | — | 1.0 | 98 | 82.3 |
| No. 17 | Example | — | — | 2.0 | 97 | 82.2 |

Figure 5:
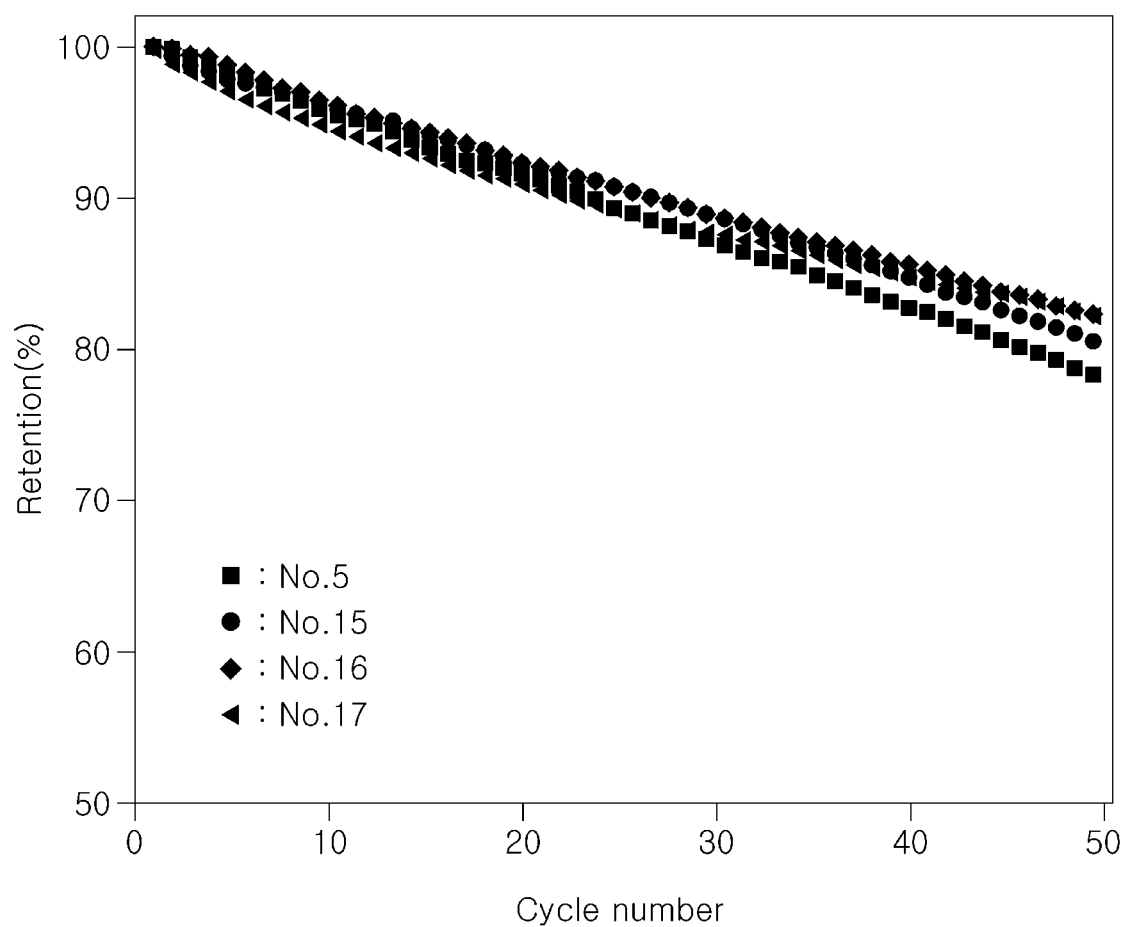

As can be seen from Table 5 and FIG. 5, No. 15, No. 16 and No. 17, in which the first positive-electrode film additive (Additive 1) according to the present disclosure was added in amounts of 0.5 wt %, 1.0 wt % and 2.0 wt %, respectively, to an electrolyte solution, exhibited a longer high-temperature lifespan than No. 5, in which no additive was added to an electrolyte solution.

Therefore, as can be seen from the above experiments, the first positive-electrode film additive (Additive 1) presented in the present disclosure exhibited improved high-temperature lifespan and oxidation stability compared to those of the conventional general functional additives VC, FEC and LiPO$_2$F$_2$. When adding 0.5 to 2.0 wt % of the first positive-electrode film additive (Additive 1), an effect of further increasing the high-temperature lifespan can be expected compared to when the functional additive is not added.

According to one form of the present disclosure, by forming a protective layer on the surface of the positive electrode active material using an electrolyte, deterioration of the cell can be suppressed, and thus an effect of increasing the life of the lithium secondary battery can be expected.

In addition, battery marketability can be improved by securing life stability at high temperatures.

Although the present disclosure has been described with reference to the annexed drawings and the preferred forms, those skilled in the art will appreciate that various modifications, additions and substitutions are possible, without departing from the scope and spirit of the present disclosure.

What is claimed is:

1. An electrolyte solution for lithium secondary batteries, the electrolyte solution comprising:
   a lithium salt;
   a solvent; and
   a functional additive,
   wherein the functional additive comprises a first positive-electrode film additive, which is 2-(2'((tert-butoxycarbonyl)amino)ethoxy)-ethyl p-methylbenzenesulfonate, represented by the following Formula 1:

[Formula 1]

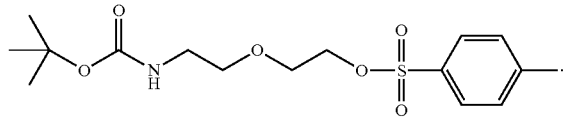

2. The electrolyte solution according to claim 1, wherein the first positive-electrode film additive is added in an amount of 0.5 to 2.0% by weight or less with respect to a weight of the electrolyte solution.

3. The electrolyte solution according to claim 1, wherein the functional additive further comprises at least one of:
   a first negative-electrode film additive which is vinylene carbonate (VC),
   a second negative-electrode film additive which is fluoroethylene carbonate (FEC), or
   a second positive-electrode film additive which is LiPO$_2$F$_2$.

4. The electrolyte solution according to claim 3, wherein the functional additive selected from at least one of the first negative-electrode film additive, the second negative-electrode film additive, or the second positive-electrode film additive is added in an amount of 0.5 to 3.0% by weight with respect to a weight of the electrolyte solution.

5. The electrolyte solution according to claim 1, wherein the lithium salt comprises at least one compound selected from a group consisting of LiPF$_6$, LiBF$_4$, LiClO$_4$, LiCl, LiBr, LiI, LiB$_{10}$Cl$_{10}$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiN(SO$_2$C$_2$F$_5$)$_2$, Li(CF$_3$SO$_2$)$_2$N, LiC$_4$F$_9$SO$_3$, LiB(C$_6$H$_5$)$_4$, Li(SO$_2$F)$_2$N (LiFSI) and (CF$_3$SO$_2$)$_2$NLi.

6. The electrolyte solution according to claim 1, wherein the solvent comprises at least one substance selected from a group consisting of carbonate solvents, ester solvents, ether solvents and ketone solvents.

7. A lithium secondary battery comprising an electrolyte solution comprising:
   a lithium salt;
   a solvent; and
   a functional additive,
   wherein the functional additive comprises a first positive-electrode film additive, which is 2-(2'((tert-butoxycarbonyl)amino)ethoxy)-ethyl p-methylbenzenesulfonate, represented by the following Formula 1:

[Formula 1]

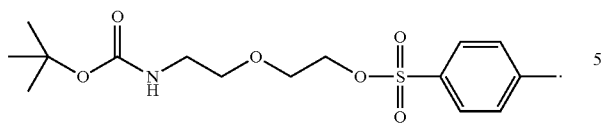

8. The lithium secondary battery according to claim 7, further comprising:
   a positive electrode including a positive-electrode active material containing Ni, Co and Mn;
   a negative electrode including a negative-electrode active material selected from a carbon (C)-based material or a silicon (Si)-based material; and
   a separator interposed between the positive electrode and the negative electrode.

9. The lithium secondary battery according to claim 8, wherein the positive electrode includes a Ni content of 80% by weight or more.

\* \* \* \* \*